United States Patent
Sugiyama

(10) Patent No.: US 12,117,779 B2
(45) Date of Patent: Oct. 15, 2024

(54) CONTROL METHOD, CONTROL DEVICE, AND RECORDING MEDIUM

(71) Applicant: Panasonic Intellectual Property Management Co., Ltd., Osaka (JP)

(72) Inventor: Masashi Sugiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 357 days.

(21) Appl. No.: 17/778,327

(22) PCT Filed: Jun. 10, 2021

(86) PCT No.: PCT/JP2021/022038
§ 371 (c)(1),
(2) Date: May 19, 2022

(87) PCT Pub. No.: WO2022/176222
PCT Pub. Date: Aug. 25, 2022

(65) Prior Publication Data
US 2023/0341821 A1    Oct. 26, 2023

(30) Foreign Application Priority Data
Feb. 22, 2021    (JP) ................. 2021-026805

(51) Int. Cl.
*G05B 13/02*    (2006.01)
*G04G 13/02*    (2006.01)
*G05B 15/02*    (2006.01)

(52) U.S. Cl.
CPC ......... *G05B 13/0255* (2013.01); *G04G 13/02* (2013.01); *G05B 15/02* (2013.01)

(58) Field of Classification Search
CPC .... G05B 13/02; G05B 13/0255; G05B 15/02; G04G 13/02; G08B 7/06; G16H 20/00
See application file for complete search history.

(56) References Cited

U.S. PATENT DOCUMENTS

| | | | |
|---|---|---|---|
| 2010/0278016 A1 | | 11/2010 | Sandu et al. |
| 2013/0114382 A1 | | 5/2013 | Xu |
| 2022/0277626 A1 | * | 9/2022 | Sugiyama .............. G16H 50/20 |

FOREIGN PATENT DOCUMENTS

| CA | 3047462 C | * | 4/2022 | .......... A01G 25/165 |
| CA | 3113013 C | * | 3/2024 | .......... A01G 25/16 |
| CN | 114207591 A | * | 3/2022 | .............. G08B 7/06 |
| JP | 2010-204076 A | | 9/2010 | |
| JP | 2010-244275 A | | 10/2010 | |

(Continued)

OTHER PUBLICATIONS

International Search Report dated Jul. 6, 2021 issued in International Patent Application No. PCT/JP2020/022038.

*Primary Examiner* — Crystal J Barnes-Bullock
(74) *Attorney, Agent, or Firm* — Rimon P.C.

(57) ABSTRACT

A time that is a predetermined period before an operation start time which is a time in a schedule at which a first device starts an operation is obtained as a prompt start time, a pattern extended or compressed along a time axis from an initial pattern indicating a temporal change in an intensity of a prompt is generated; and a second device is caused to start outputting the prompt at the prompt start time and to output the prompt with an intensity indicated by the pattern generated.

14 Claims, 12 Drawing Sheets

(56) References Cited

FOREIGN PATENT DOCUMENTS

| | | | |
|---|---|---|---|
| JP | 2014-509734 A | 4/2014 | |
| JP | 5543217 A | 5/2014 | |
| JP | 5689188 B2 | 2/2015 | |
| JP | 2017-55302 A | 3/2017 | |
| JP | 2018-82417 A | 5/2018 | |
| JP | 7407663 B2 * | 1/2024 | ........... F24H 15/196 |
| WO | 2008090494 A1 | 7/2008 | |
| WO | WO-2020054596 A1 * | 3/2020 | ..... G06Q 10/063114 |
| WO | WO-2021171737 A1 * | 9/2021 | ............... G08B 7/06 |

* cited by examiner

| Numerical value in minutes of operation start time | Extension rate range | Range of time period till maximum sound volume | Evaluation value |
|---|---|---|---|
| 0 | 1 ~ 6 | 10 ~ 60 seconds | 4 |
| 30 | 1 ~ 4 | 10 ~ 40 seconds | 3 |
| 15, 45 | 1 ~ 2 | 10 ~ 20 seconds | 2 |
| 10, 20, 40, 50 | 1 ~ 1.5 | 10 ~ 15 seconds | 1 |
| Others | 1 | 10 seconds | 0 |

CONTROL METHOD, CONTROL DEVICE, AND RECORDING MEDIUM

CROSS-REFERENCE OF RELATED APPLICATIONS

This application is the U.S. National Phase under 35 U.S.C. § 371 of International Patent Application No. PCT/JP2021/022038, filed on Jun. 10, 2021, which in turn claims the benefit of Japanese Patent Application No. 2021-026805, filed on Feb. 22, 2021, the entire disclosures of which Applications are incorporated by reference herein.

TECHNICAL FIELD

The present disclosure relates to a control method, a control device, and a recording medium.

BACKGROUND ART

A conventional technique is available in which, when a server executes processes for respective users, execution of each process starts at a time set among time slots other than predetermined time slots each including the beginning of the hour (see Patent Literature (PTL) 1).

CITATION LIST

Patent Literature

[PTL 1] Japanese Unexamined Patent Application Publication No. 2018-82417

SUMMARY OF INVENTION

Technical Problem

However, the timing at which the server executes the process for each user becomes concentrated, such a problem occurs that the server load increases at that timing.

In view of the above, the present disclosure provides, for example, a control method of reducing an increase in server load.

Solution to Problem

A control method according to the present disclosure is a control method which includes: obtaining, as a prompt start time, a time that is a predetermined period before an operation start time which is a time in a schedule at which a first device starts an operation; generating a pattern that is extended or compressed along a time axis from an initial pattern indicating a temporal change in an intensity of a prompt; and causing a second device to start outputting the prompt at the prompt start time and to output the prompt with an intensity indicated by the pattern generated.

With the above aspect, a prompt is output in a pattern extended or compressed from the initial pattern, so that the timing at which each user operates the terminal based on the output prompt can be distributed. When the server processing or communication is generated based on the operation, the timing of the processing or communication is distributed. This reduces an instantaneous increase in load or communication amount of the server. Accordingly, the control method according to the present disclosure is capable of reducing an increase in server load.

A possible measure for distributing the processing timing of the server other than the above is to distribute the timing at which a prompt starts to be output. However, when the timing at which the prompt starts to be output is changed, the output of the prompt may start after the prompt start time. In such a case, the user may recognize that the system has a failure because the output of the prompt does not start at the desired prompt start time. Accordingly, it is inappropriate to distribute the timing at which the prompt starts to be output in order to distribute the processing timing of the server. It can also be said that the control method according to the present disclosure is also capable of reducing an increase in server load without executing the above inappropriate processing.

In addition, it may be that the generating includes determining whether or not the operation start time meets a predetermined condition; and the generating of the pattern is performed when the operation start time is determined to meet the predetermined condition.

With the above aspect, a prompt is output in a pattern extended or compressed from the initial pattern when the operation start time meets a predetermined condition, so that the timing at which each user operates the terminal based on the output prompt can be distributed. Accordingly, when it is assumed that the same operation start time is set to a plurality of first devices, the time at which a prompt is output can be distributed. As a result, it is possible to reduce an increase in server load.

Moreover, it may be that in the determining, the predetermined condition is a condition in which the operation start time is a time predetermined as a time that is relatively highly probable to be set as the operation start time by each of users of a plurality of a first devices each of which is the first device.

With the above aspect, it is possible to distribute the processing timing of the server when the time that is relatively highly probable to be set by a plurality of users as the operation start time is set as the operation start time. The time that is relatively highly probable to be set by a plurality of users as the operation start time tends to be set as the operation start time by a large number of users. Hence, the server load tends to increase at the time at which each user notices the prompt before the operation start time. In view of the above, it is possible to distribute the processing timing of the server by outputting a prompt in a pattern extended or compressed from the initial pattern, when the operation start time obtained from the user is the time that is relatively highly probable to be set by a plurality of users as the operation start time. Accordingly, the control method according to the present disclosure is capable of reducing an increase in server load.

Moreover, it may be that in the determining, the predetermined condition is a condition in which a numerical value in minutes of the operation start time that is expressed in hours, minutes, and seconds is 0, an integral multiple of 10, or an integral multiple of 15.

With the above aspect, as the time that is relatively highly probable to be set by a plurality of users as the operation time, specifically, the time that is expressed in hours, minutes, and seconds and in which the numerical value in minutes is 0, an integral multiple of 10, or an integral multiple of 15 is used. Hence, it is possible to more easily determine whether or not the operation start time received from the user is the time that is relatively highly probable to be set by a plurality of users as the operation start time.

Accordingly, the control method according to the present disclosure is capable of more easily reducing an increase in server load.

In addition, it may be that the determining further includes determining a range of an extension or compression rate according to the operation start time, the determining of the range of the extension or compression rate includes: determining a first range as the range of the extension or compression rate when the numerical value in minutes of the operation start time that is expressed in hours, minutes, and seconds is 0; determining a second range that is smaller than the first range as the range of the extension or compression rate when the numerical value in minutes of the operation start time that is expressed in hours, minutes, and seconds is 30; determining a third range that is smaller than the second range as the range of the extension or compression rate when the numerical value in minutes of the operation start time that is expressed in hours, minutes, and seconds is 15 or 45; and determining a fourth range that is smaller than the third range as the range of the extension or compression rate when the numerical value in minutes of the operation start time that is expressed in hours, minutes, and seconds is 10, 20, 40, or 50, and the generating of the pattern includes generating the pattern with an extension or compression rate included in the range of the extension or compression rate determined.

With the above aspect, a pattern is generated according to the numerical value in minutes, when the operation start time received from the user is the time that is relatively highly probable to be set by a plurality of users as the operation start time. With an increase in probability, a pattern extended or compressed with a larger extension or compression rate is generated. Hence, when the operation start time is set to the time at which the server load tends to increase, the extension or compression rate of the pattern increases. This increases the effect of distributing the server load. Accordingly, the control method according to the present disclosure is capable of reducing an increase in server load more adaptively according to the set operation start time.

Moreover, it may be that the generating of the pattern includes selecting randomly one of a plurality of extension or compression rates included in the range of the extension or compression rate determined, and generating the pattern with the one of the plurality of extension or compression rates selected.

With the above aspect, a pattern is generated with an extension or compression rate selected randomly from among the determined range of the extension or compression rate, so that it is possible to increase the effect of distributing the server load. Accordingly, the control method according to the present disclosure is capable of further reducing an increase in server load.

Moreover, it may be that the initial pattern is a pattern in which the intensity of the prompt is maintained or increases over time.

With the above aspect, a pattern in which the intensity of the prompt is maintained or increases over time is used as the initial pattern, and a prompt is output to the user with a pattern generated from the initial pattern. Accordingly, the control method according to the present disclosure is capable of more easily reducing an increase in server load.

Moreover, it may be that the initial pattern is a pattern in which: (a) the intensity of the prompt increases from 0 at the prompt start time; (b) the intensity of the prompt increases and decreases in a range that is greater than 0 and less than a predetermined intensity during a second predetermined period after the prompt start time;

and (c) the intensity of the prompt is maintained at the predetermined intensity after an elapse of the second predetermined period from the prompt start time.

With the above aspect, a prompt is output to the user by using, as the initial pattern, a pattern in which the user is prompted with an intensity which increases and decreases but finally reaches a maximum level, and by using a pattern generated from the initial pattern. Accordingly, the control method according to the present disclosure is capable of more easily reducing an increase in server load.

Moreover, it may be that the control method further includes: performing control for changing the schedule of the first device when receiving, after the prompt start time, an operation for changing the schedule of the first device from a user.

With the above aspect, the timing of control for changing the schedule of the first device based on an operation made by the user is distributed. Accordingly, the server load is distributed, reducing an increase in server load.

Moreover, it may be that the first device is a device which fills a bathtub with hot water, and the operation of the first device is to fill the bathtub with hot water.

With the above aspect, the timing at which the first device changes the schedule of filling the bathtub with hot water and the communication timing for the change are distributed. Accordingly, it is possible to reduce an increase in load of the server which controls a device which fills the bathtub with hot water.

Moreover, it may be that the first device is a device which transmits video data, and the operation of the first device is to transmit the video data.

With the above aspect, the timing at which the first device changes the schedule of transmission of video data and the communication timing for the change are distributed. Accordingly, it is possible to reduce an increase in server load which controls a device which transmits video data.

Moreover, it may be that the prompt includes any one of sound, light, temperature, wind, and vibration.

With the above aspect, any one of sound, light, temperature, wind, and vibration is used as a prompt. Accordingly, the control method according to the present disclosure is capable of reducing an increase in server load while using any one of the sound, light, temperature, wind, and vibration as a prompt.

In addition, a control device according to the present disclosure is a control device which includes: a receiver which obtains, as a prompt start time, a time that is a predetermined period before an operation start which is a time in a schedule at which a first device starts an operation; a generator which generates a pattern extended or compressed along a time axis from an initial pattern indicating a temporal change in an intensity of a prompt; and a prompt controller which causes a second device to start outputting the prompt at the prompt start time, and to output the prompt with an intensity indicated by the pattern generated.

With the above aspect, the advantageous effects which are the same as the control method described above can be provided.

Moreover, a recording medium according to the present disclosure is a non-transitory computer-readable recording medium for use in a computer, the recording medium having a computer program recorded thereon for causing the computer to execute the control method described above.

With the above aspect, the same advantageous effects as the control method described above can be provided.

General and specific aspects disclosed above may be implemented using a system, a device, an integrated circuit, a computer program, a computer-readable recording medium such as a CD-ROM, or any combination of systems, devices, integrated circuits, computer programs, or recording media.

Advantageous Effects of Invention

The control method according to the present disclosure is capable of reducing an increase in server load.

DESCRIPTION OF EMBODIMENTS

Hereinafter, an embodiment will be described in detail with reference to the drawings as necessary. However, more detailed explanation than necessary may be omitted. For example, detailed explanations of already well-known matters or duplicate explanations for substantially the same configuration may be omitted. This is to avoid the following description to become unnecessarily redundant, and to facilitate understanding of the person skilled in the art.

The inventor provides the accompanying drawings and the following description so that the person skilled in the art fully understands the present disclosure, and do not intend to limit the subject matter of the claims by this.

An embodiment will be described below after providing the detailed description of the background of the present disclosure and the problems to be solved by the present disclosure.

EMBODIMENT

In the present embodiment, a control method and the like of reducing an increase in server load will be described.

Figure 1:
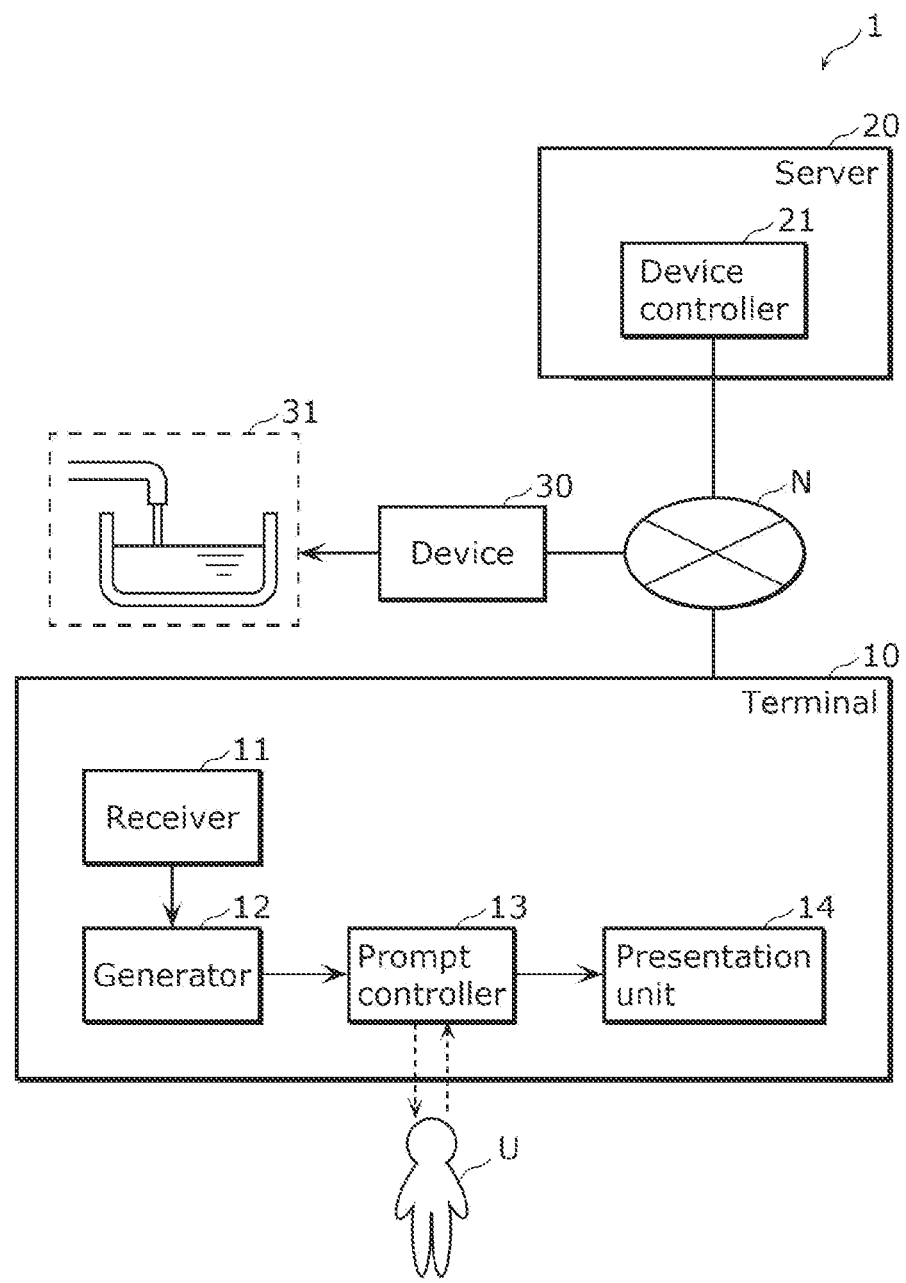
FIG. 1 schematically illustrates a configuration of a system according to an embodiment.

FIG. 1 schematically illustrates a configuration of system 1 according to the present embodiment. System 1 illustrated in FIG. 1 is a system which performs an inquiry related to an operation of a device with a prompt to user U.

Here, the case where the device is device 30 which fills bathtub 31 with hot water will be described as an example. The device is also referred to as a first device. The operation performed by device 30 is to fill the bathtub with hot water. System 1 displays presentation information on the screen of a terminal at a predetermined period before the time at which device 30 is scheduled to start filling bathtub 31 with hot water. The presentation information is information that inquires whether to fill bathtub 31 with hot water as scheduled. System 1 also prompts the user to notice the inquiry with an output of alarm sound and a change in output sound volume.

Here, the alarm sound is an example of a prompt to user U, and a description of this example will be given. However, the prompt to user U may include any one of sound, light, temperature, wind (more generally, movement of the air) and vibration, and may also include presence or absence of the sound, light, temperature, wind or vibration or a change in intensity of the sound, light, temperature, wind, or vibration. The prompt to user U can also be referred to as a prompt which prompts user U to notice the inquiry from system 1.

As illustrated in FIG. 1, system 1 includes terminal 10 and server 20. Terminal 10 and server 20 are communicatively connected to each other via network N. System 1 is communicatively connected to device 30 via network N. It is assumed that single terminal 10 is associated with single device 30 for single user U. Although it is assumed that there are a plurality of users, that is, there are a plurality of terminals 10 and a plurality of devices 30, the present disclosure is not limited to such an assumption. In this case, server 20 is communicatively connected to terminals 10 and devices 30.

Terminal 10 is a communication terminal owned by user U. Terminal 10 receives, from user U, a time in a schedule at which bathtub 31 starts being filled with hot water (also referred to as an operation start time). Terminal 10 outputs alarm sound at a predetermined period before the start time (also referred to as a prompt start time), and inquires of user U whether to start filing bathtub 31 with hot water at the operation start time as scheduled. When receiving an operation made by user U for changing the schedule of filing bathtub 31 with hot water, terminal 10 performs control for changing the schedule. Terminal 10 is an example of a device which outputs a prompt to user U, and corresponds to a second device. The predetermined period is, for example, approximately ten minutes to fifteen minutes, but the present disclosure is not limited to such an example. Terminal 10 is, for example, a mobile terminal which is a computer such as a smart phone or a tablet.

Server 20 is a server which controls device 30, and includes device controller 21 which controls device 30. Device controller 21 obtains and manages the operation start time as a schedule of the operation of device 30 (specifically, an operation of filling bathtub 31 with hot water).

Device controller 21 causes device 30 to operate by transmitting control information to device 30 at the operation start time. In addition, when receiving control information for changing the operation schedule (specifically, changing the operation start time or canceling the operation) from terminal 10, device controller 21 changes the schedule according to the control information.

Device 30 is a device which fills bathtub 31 with hot water, Device 30 starts filling bathtub 31 with hot water at the operation start time according to the control by device controller 21. It is assumed that device 30 is a device provided at home of user U. Device 30 may be another device provided at home of user U, instead of the device which controls filling bathtub 31 with hot water.

It is assumed that user U originally sets the scheduled time of filling bathtub 31 with hot water to terminal 10, but afterwards, changes the schedule of filling bathtub 31 with hot water, that is, changes the bathtub filling time, or cancels the schedule. System 1 provides, to the user, a chance for an operation for changing the schedule, and also reduces an increase in load of server 20 at the time of changing the schedule.

Terminal 10 will be described in more detail.

As illustrated in FIG. 1, terminal 10 includes receiver 11, generator 12, prompt controller 13, and presentation unit 14. Each functional unit of terminal 10 described above can be implemented by a central processing unit (CPU) executing a program using a memory.

Receiver 11 is a functional unit which obtains a prompt start time. Receiver 11 obtains the operation start time which is a time in a schedule at which device 30 starts the operation, and obtains, as the prompt start time, the time that is a predetermined period before the obtained operation start time. The predetermined period is, for example, five minutes or ten minutes, but the present disclosure is not limited to such an example.

Receiver 11 receives a user operation for setting the operation start time via an appropriate user interface device (UI device). For example, receiver 11 receives a touch operation made by user U on the screen or the like of terminal 10 via a touch panel display that is a UI device. Receiver 11 may also receive a voice operation made by user U via a microphone that is a UI device.

The operation start time is an example of an operation start time which is a time in a schedule at which the first device starts the operation. The prompt start time is an example of a prompt start time at which the terminal outputs a prompt.

Generator 12 is a functional unit which generates a pattern which indicates a temporal change in volume of the alarm sound (also simply referred to as a pattern). Specifically, generator 12 generates a pattern extended or compressed along the time axis from the initial pattern which indicates a temporal change in volume of the alarm sound. The initial pattern is, for example, a pattern in which the volume of the alarm sound changes from 0 to the maximum sound volume over ten seconds, that is, a pattern in which the time period taken from when the alarm sound starts to be output till when the sound volume reaches the maximum sound volume is ten seconds.

Generator 12 may determine whether or not the operation start time meets a predetermined condition. When determining that the operation start time meets the predetermined condition, generator 12 may generate a pattern. At this time, the predetermined condition may be the condition in which the operation start time is the time predetermined as the time that is relatively highly probable to be set by each user of devices 30 as the operation start time. More specifically, generator 12 may make the determination with a predetermined condition that is the condition in which the numerical value in minutes of the operation start time that is expressed in hours, minutes, and seconds is 0, an integral multiple of 10, or an integral multiple of 15. Moreover, the condition in which the numerical value in minutes of the prompt start time that is expressed in hours, minutes, and seconds is an integral multiple of 5 may be added to the above condition. The pattern generated by generator 12 will be described later in detail.

Prompt controller 13 is a functional unit which controls the output of alarm sound performed by terminal 10. Prompt controller 13 causes terminal 10 to start outputting alarm sound at the prompt start time, and to output the alarm sound with the intensity (that is the sound volume) indicated by the pattern generated by generator 12. Prompt controller 13 also causes terminal 10 to stop outputting the alarm sound when receiving, from user U, an operation for stopping the output of the alarm sound.

Presentation unit 14 is a functional unit which presents presentation information to user U. Presentation unit 14 obtains the presentation information from server 20, and presents the obtained presentation information to user U via a UI device. Specifically, when prompt controller 13 outputs alarm, presentation unit 14 presents the presentation information to user U by displaying the presentation information on the screen that is a UI device. Presentation unit 14 may present the obtained presentation information to user U by outputting the presentation information as voice via a speaker that is a UI device.

When receiving an operation made by user U for changing the schedule, presentation unit 14 performs control for changing the schedule of device 30. More specifically, presentation unit 14 transmits control information indicating the change of the schedule of device 30 to server 20. The schedule change includes a change of the operation start time or cancellation of the operation.

Figures 2, 3:
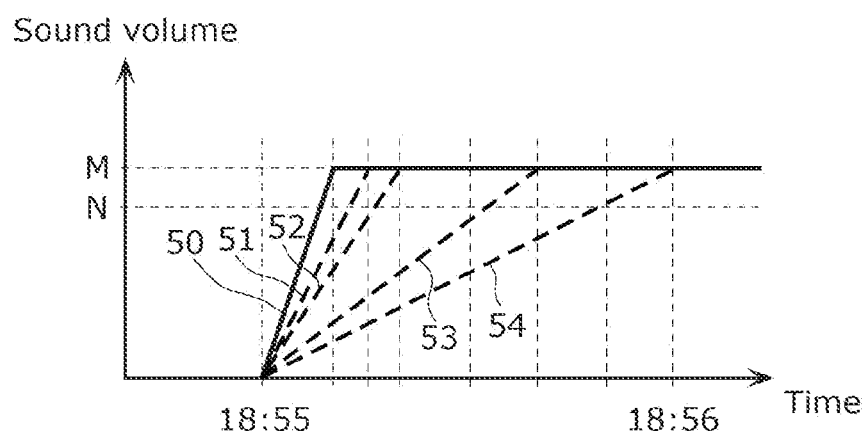
FIG. 2 illustrates a temporal change in sound volume controlled by a prompt controller according to the embodiment.
FIG. 3 illustrates ranges of an extension rate according to the embodiment.

FIG. 2 illustrates ranges of an extension rate according to the present embodiment. Each range of the extension rate indicated in FIG. 2 is used by generator 12 to generate a pattern.

As illustrated in FIG. 2, the range of the extension rate is determined according to the numerical value in minutes of the operation start time (also simply referred to as the numerical value of minutes) received by receiver 11 from user U. In addition, in FIG. 2, the range of the time period taken till reaching the maximum sound volume is associated with an evaluation value according to the numerical value of minutes of the operation start time received by receiver 11 from user U.

Specifically, "0" as the numerical value of minutes of the operation start time is associated with "1 to 6" (corresponding to a first range) as the range of the extension rate. When the time period taken from the start till reaching the maximum sound volume in the initial pattern is ten seconds, the range of the time period taken from the start till reaching the maximum sound volume in the pattern generated by generator 12 is 10 seconds to 60 seconds.

In a similar manner, "30", "15 or 45", and "10, 20, 40 or 50" as the numerical value of minutes of the operation start time are respectively associated with "1 to 4" (corresponding to a second range), "1 to 2" (corresponding to a third range), and "1 to 1.5" (corresponding to a fourth range) as the range of the extension rate. When the time period taken from the start till reaching the maximum sound volume in the initial pattern is 10 seconds, the ranges of the time period taken from the start till reaching the maximum sound volume in the pattern generated by generator 12 for "30", "15 or 45", and "10, 20, 40 or 50" as the numerical value of minutes of the operation start time are respectively "10 to 40 seconds", "10 to 20 seconds", and "10 to 15 seconds".

When the numerical value of minutes of the operation start time is "others", that is, when the operation start time is the operation start time other than the above, the range of the extension rate is 1, and the time period taken from the start till reaching the maximum sound volume is ten seconds in a similar manner to the initial pattern.

Moreover, the evaluation value is defined as an evaluation value which indicates the level of nice round number of the numerical value in minutes of the operation start time that is expressed in hours, minutes, and seconds. As the numerical value of the evaluation value increases, the level of nice round number increases. Here, the term "nice round number" also means a simple number, and a nice round time is a time that is generally easy to remember for user U, a time that is used by user U as a guide to take an action, and a time that is easily sectioned.

Here, as an example, the numerical value in minutes of the operation start time is classified into five groups that are "0", "30", "15 or 45", "10, 20, 40, or 50", and "others". Here, it is defined that "0" is the nicest round number, and an evaluation value of 4 is set to "0". In addition, it is defined that "others" is the least nicest round number, and an evaluation value of 0 is set to "others". The level of nice round number decreases in the order of "30", "15 or 45", and "10, 20, 40, or 50", and evaluation values of 3, 2, and 1 are respectively set to "30", "15 or 45", and "10, 20, 40, or 50".

In general, user U is highly probable to set a nice round time as the time for filling bathtub 31 with hot water. With an increase in level of a nice round time, such a time is highly probable to be set. Hence, "the evaluation value of the level of nice round number" indicates the level of probability that the user sets as the operation start time.

FIG. 3 illustrates a temporal change in sound volume controlled by prompt controller 13 according to the present embodiment.

FIG. 3 illustrates patterns 50, 51, 52, 53, and 54 of the temporal change in sound volume where the horizontal axis indicates time and the vertical axis indicates alarm sound volume. Sound volume M in the vertical axis indicates the maximum sound volume. Sound volume N is 70% to 80% of the maximum sound volume, and indicates the sound volume that is assumed that user U would notice the prompt being given.

Pattern 50 is an example of an initial pattern. Pattern 50 is a pattern in which the sound volume increases at a constant rate from 18:55:00 that is the prompt start time, reaches the maximum sound volume at 18:55:10, and is then maintained at the maximum sound volume. In other words, pattern 50 is a pattern in which the sound volume linearly increases over time from the prompt start time, reaches the maximum sound volume, and then is maintained at the maximum sound volume. The initial pattern is a preset pattern, and is a pattern serving as a reference when patterns that are described later are generated. Pattern 50 is also a pattern generated by generator 12 when the numerical value in minutes of the operation start time is "others".

The initial pattern may be a pattern in which the volume of the alarm sound (more generally, the intensity of the prompt) is maintained or increases over time. The initial pattern may have a feature that the volume of the alarm sound after the prompt start time is larger than the volume of the alarm sound at the prompt start time.

Moreover, the initial pattern may be a pattern in which "(a) the intensity of the prompt increases from 0 at the prompt start time, (b) the intensity of the prompt increases or decreases in a range that is greater than 0 and less than a predetermined intensity during a predetermined period after the prompt start time (may also referred to as a second predetermined period), and (c) the intensity of the prompt is maintained at a predetermined intensity after an elapse of the predetermined period from the prompt start time. The predetermined period may be in units of time that can be set as the prompt start time, and may be, for example, one minute.

Each of patterns 51 to 54 is an example of a pattern extended from the initial pattern along the time axis, and is an example of a pattern generated by generator 12 so as to correspond to the numerical value in minutes of the operation start time. Patterns 51 to 54 will be described below.

Pattern 51 is a pattern generated by extending pattern 50 1.5 times along the time axis. Pattern 51 is a pattern extended the greatest along the time axis among the patterns generated by generator 12 when the numerical value in minutes of the operation start time is "10, 20, 40, or 50". In other words, when the numerical value in minutes of the operation start time is "10, 20, 40, or 50", generator 12 generates a pattern extended from the initial pattern at the extension rate between pattern 50 and pattern 51.

Pattern 52 is a pattern generated by extending pattern 50 twice along the time axis. Pattern 52 is a pattern extended the greatest along the time axis among the patterns generated by generator 12 when the numerical value in minutes of the operation start time is "15 or 45". In other words, when the numerical value in minutes of the operation start time is "15 or 45", generator 12 generates a pattern extended from the initial pattern at the extension rate between pattern 50 and pattern 52.

Pattern 53 is a pattern generated by extending pattern 50 four times along the time axis. Pattern 53 is a pattern extended the greatest along the time axis among the patterns generated by generator 12 when the numerical value in minutes of the operation start time is "30". In other words, when the numerical value in minutes of the operation start time is "30", generator 12 generates a pattern extended from the initial pattern at the extension rate between pattern 50 and pattern 53.

Pattern 54 is a pattern obtained by extending pattern 50 six times along the time axis. Pattern 54 is a pattern extended the greatest along the time axis among the patterns generated by generator 12 when the numerical value in minutes of the operation start time is "0". In other words, when the numerical value in minutes of the operation start time is "0", generator 12 generates a pattern extended from the initial pattern at the extension rate between pattern 50 and pattern 54.

In other words, generator 12 generates patterns 51 to 54 by reducing the inclination or gradient of the change in volume of the alarm sound relative to pattern 50.

In such a manner, generator 12 may determine a first range as the range of the extension rate when the numerical value in minutes of the operation start time that is expressed in hours, minutes, and seconds is 0, determine a second range when the numerical value in minutes is 30, determine a third range when the numerical value in minutes is 15 or 45, and determine a fourth range when the numerical value in minutes is 10, 20, 40, or 50. Here, it is set such that the first range, the second range, the third range, and the fourth range decrease in the mentioned order.

With this, when user U sets, as the operation start time, the time that is highly probable to be set as the operation start time, it is possible to increase the effect of distributing the subsequent processing timing of server 20 by extending the initial pattern in a wider range. In addition, when user U sets, as the operation start time, the time that is relatively less probable to be set as the operation start time, it is possible to prompt user U to notice the inquiry earlier by extending the initial pattern in a narrower range.

When generating a pattern as described above, generator 12 may randomly determine the extension rate between pattern 50 and any one of patterns 51 to 54 to determine a pattern. In order to achieve the random determination, an ideal random value may be used or a quasi-random value may be used. In addition, the numerical value in milliseconds of the operation start time that is expressed in hours, minutes, and seconds may be used as a random value.

Figure 4:
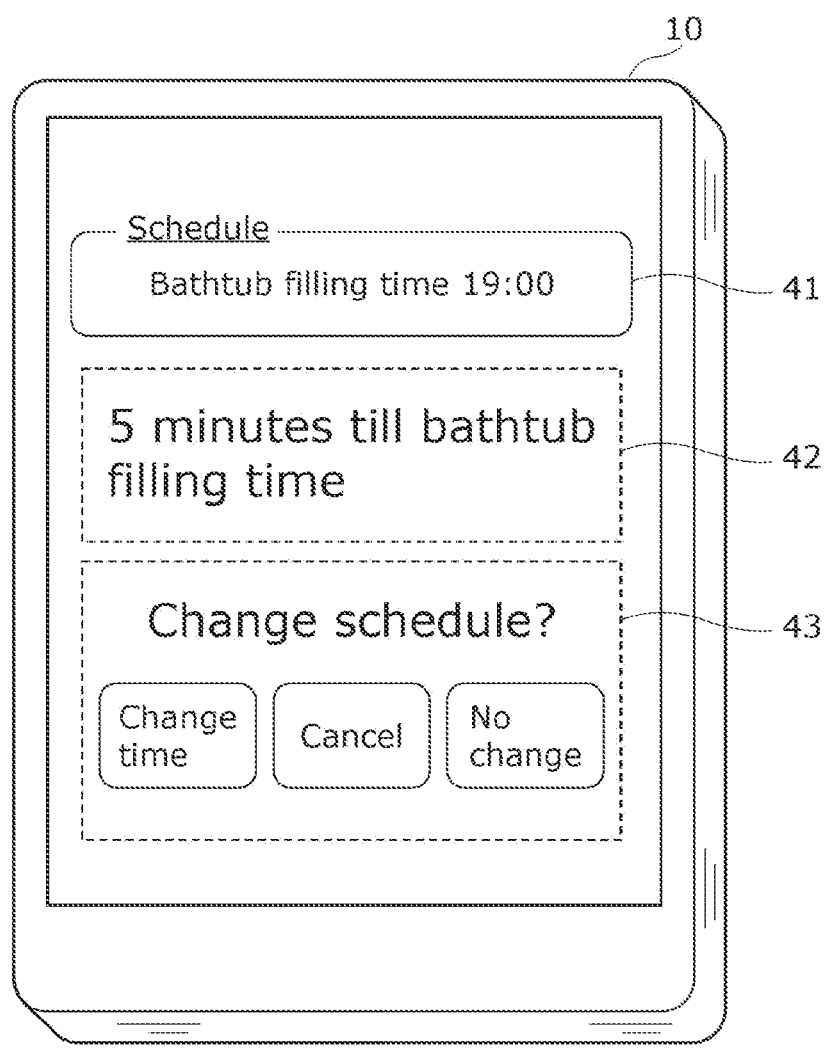
FIG. 4 illustrates an example of presentation information according to the embodiment.

FIG. 4 illustrates an example of presentation information according to the present embodiment. The presentation information illustrated in FIG. 4 is an example of an image displayed on the screen by presentation unit 14 of terminal 10.

The image illustrated in FIG. 4 includes image 41, image 42, and image 43.

Image 41 is an image which indicates the operation start time which is a time in a schedule at which device 30 starts the operation, and indicates "19:00" as an example of the operation start time.

Image 42 is an image notifying the user that it is a predetermined period before the operation start time, and indicates, as an example, that it is five minutes until the bathtub filling time.

Image 43 includes an image indicating an inquiry to the user whether to change the schedule of the operation of device 30, and an image indicating options that are "change time", "cancel", and "no change" as a response to the inquiry. User U is capable of performing a selecting operation on such options.

When receiving an operation made by user U for selecting "change time", presentation unit 14 transmits, to server 20, control information for changing the operation start time.

When receiving an operation made by user U for selecting "cancel", presentation unit 14 transmits, to server 20, control information for canceling the operation of device 30, that is, for not causing device 30 to operate.

When receiving an operation made by user U for selecting "no change", presentation unit 14 transmits, to server 20, control information for causing device 30 to operate as scheduled. In this case, presentation unit 14 may perform nothing on server 20, so that server 20 causes device 30 to operate as originally scheduled. When receiving no operation for the options, the process which is the same as the case where "no change" is selected may be performed.

The options of the response may include "change operation". When receiving an operation made by user U for selecting "change operation", presentation unit 14 transmits, to server 20, control information for changing the details of the operation without changing the operation start time.

The processes performed by system 1 configured as above will be described.

Figure 5:
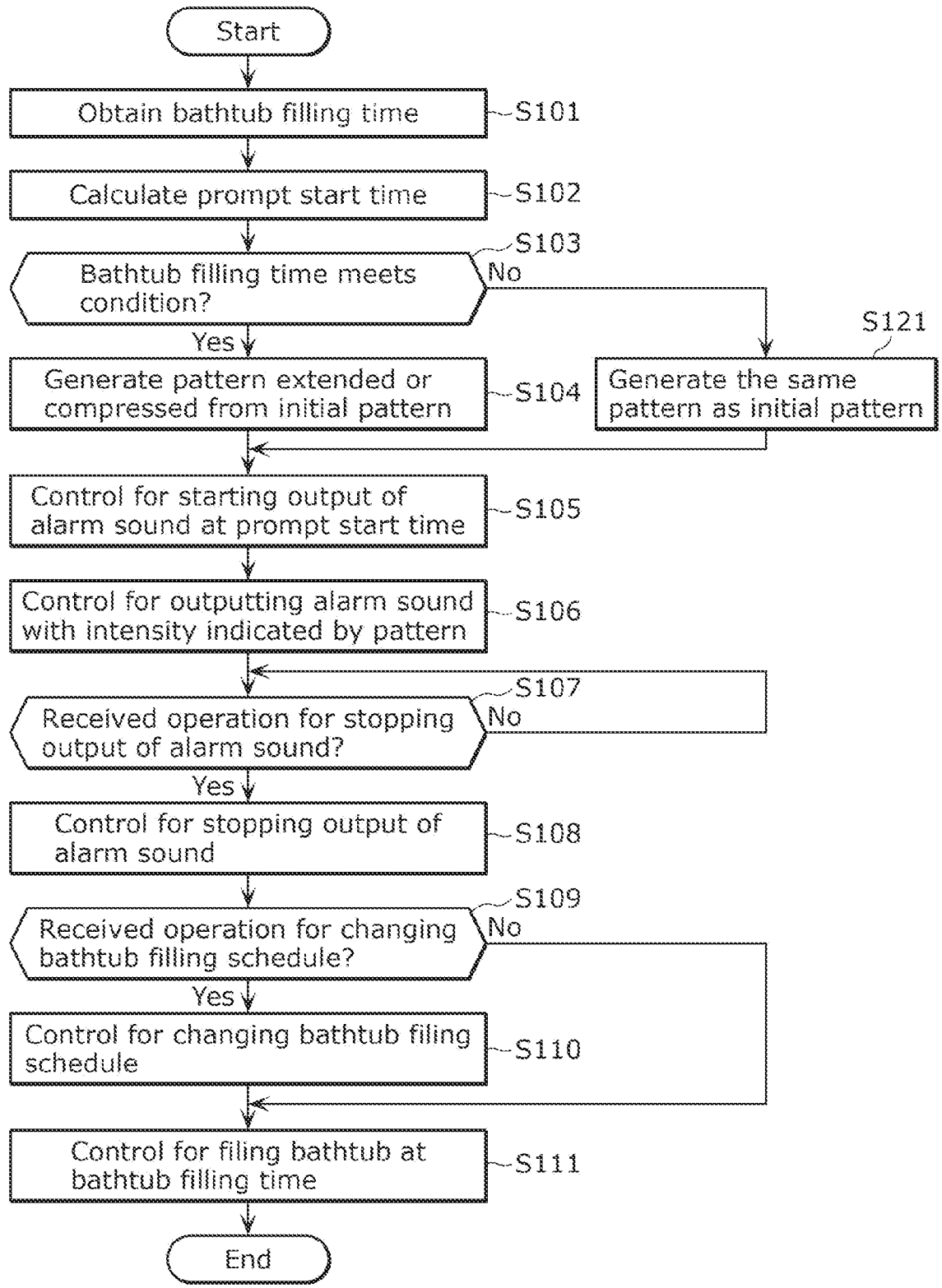
FIG. 5 is a flow diagram of processes executed by the system according to the embodiment.

FIG. 5 is a flow diagram of processes executed by system 1 according to the present embodiment. The flow diagram illustrated in FIG. 5 indicates a control method for controlling terminal 10 which outputs a prompt to the user.

In step S101, receiver 11 obtains the bathtub filling time from user U.

In step S102, receiver 11 uses the bathtub filling time obtained in step S101 to obtain the prompt start time that is a predetermined period before the bathtub filling time.

In step S103, generator 12 determines whether or not the bathtub filling time received by receiver 11 in step S101 meets a predetermined condition. More specifically, generator 12 determines whether or not the bathtub filling time received by receiver 11 in step S101 is a time preset as the nice round time, for example, whether or not the numerical value in minutes of the bathtub filling time matches any one of "0, 30, 15, 45, 10, 20, 40, 50". When the bathtub filling time meets the predetermined condition (Yes in step S103), the process proceeds to step S104, and when not (No in step S103) the process proceeds to step S121.

In step S104, generator 12 generates a pattern extended or compressed from the initial pattern. Here, it may be that generator 12 sets a different extension or compression rate according to the numerical value in minutes of the bathtub filling time, and generate a pattern extended or compressed at the set extension or compression rate.

In step S121, generator 12 generates the same pattern as the initial pattern.

After step S104 or step S121, the process proceeds to step S105.

In step S105, prompt controller 13 performs control for starting the output of the alarm sound at the prompt start time obtained in step S105. Presentation unit 14 also displays presentation information on the screen.

In step S106, prompt controller 13 controls the volume of the alarm sound with the intensity indicated by the pattern determined in step S103 or step S121. It is assumed that the alarm sound output as described above makes user U notice the inquiry from terminal 10, and that user U performs an operation for changing the schedule on terminal 10 in response to the inquiry.

In step S107, prompt controller 13 determines whether or not an operation for stopping the output of the alarm sound has been received. When determining that the operation for stopping the output of the alarm sound has been received (Yes in step S107), the process proceeds to step S108, and when not (No in step S107), step S107 is executed again. In other words, prompt controller 13 is in a standby state in step S107 till receiving an operation for stopping the output of the alarm sound.

In step S108, prompt controller 13 performs control for stopping the output of the alarm sound.

In step S109, presentation unit 14 determines whether or not an operation for changing the schedule of filling bathtub 31 with hot water (specifically, an operation for changing the operation start time or an operation for causing no operation) has been received from user U.

In step S110, based on the operation received in step S109, presentation unit 14 performs control for changing the schedule of filling bathtub 31 with hot water (specifically control for changing the operation start time or control for not to operate) on server 20. Specifically, presentation unit 14 transmits, to server 20, control information for changing the operation start time or control information indicating control for not to operate.

In step S111, device controller 21 causes device 30 to fill bathtub 31 with hot water at the bathtub filling time.

By the series of processes illustrated in FIG. 5, system 1 is capable of reducing an increase in load of server 20. Specifically, it is possible to reduce an increase in load generated in the process of changing the bathtub filling time and the communication process executed by server 20 during step S110.

Next, processes of system 1 as a whole according to the present embodiment will be described while comparing with a related technique.

Figure 6:
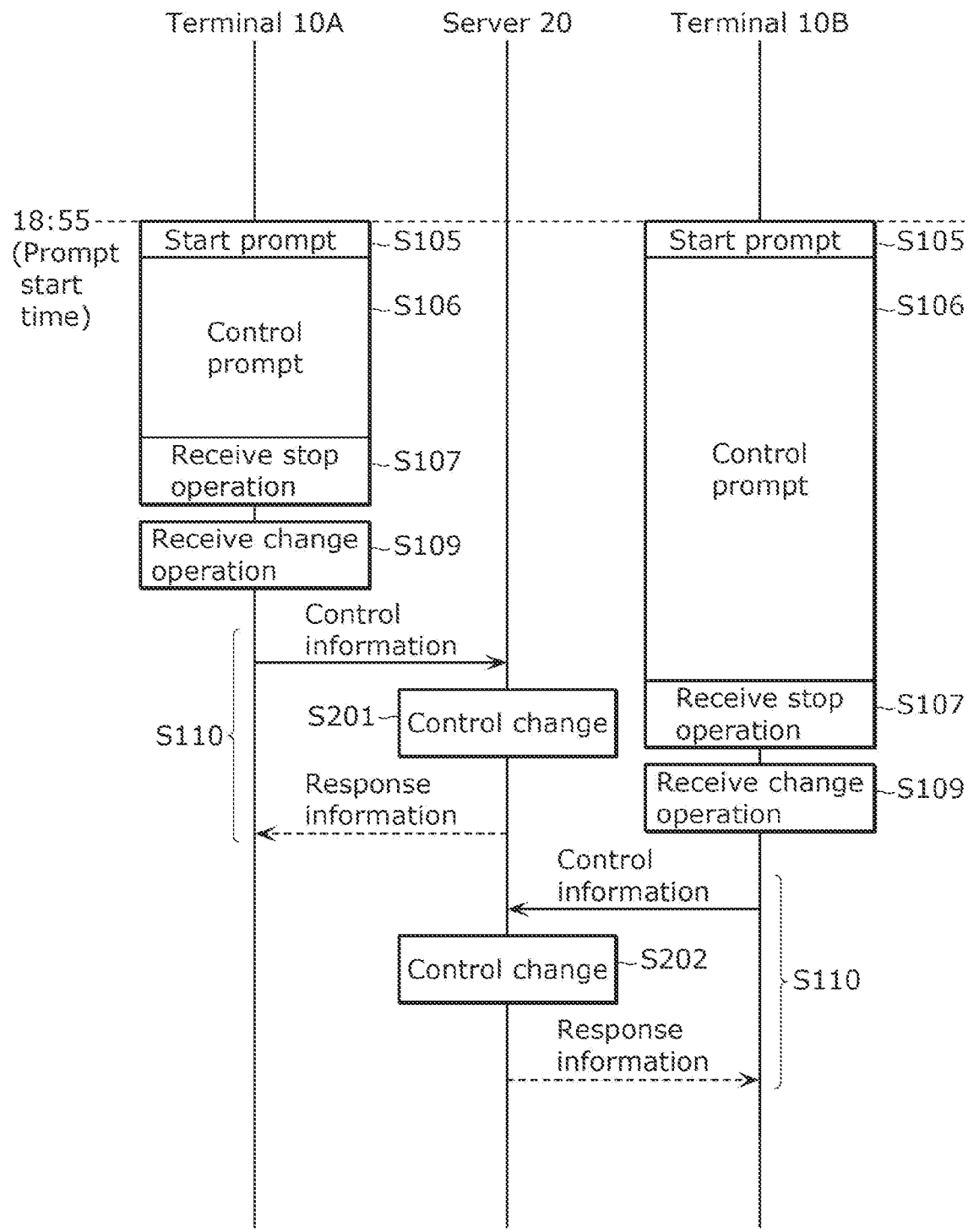
FIG. 6 is a sequence diagram illustrating processes of the system as a whole according to the embodiment.

FIG. 6 is a sequence diagram illustrating processes of system 1 as a whole according to the present embodiment.

As an example, the case in FIG. 6 where server 20 receives control for changing the bathtub filling time from two users U who have originally set, for example, 19:00 as the bathtub filling time will be described as an example. Note that the number of users is not limited to two, but may be several hundreds, several tens of thousands, or more than that, and as the number of users increases, the advantageous effects of the present disclosure become more distinct.

FIG. 6 indicates processes performed between terminals 10A and 10B of two users U and server 20. The processes which are the same as the processes illustrated in FIG. 5 are assigned the same reference numbers, and the detailed description thereof may be omitted.

Each of terminals 10A and 10B obtains 18:55 that is five minutes before the bathtub filling time as the prompt start time (step S102). Before the prompt start time, the pattern generating processes and the like by terminals 10A and 10B have been completed (step S103 and S104). At this time, the bathtub filling time is 19:00, that is, the numerical value in minutes is 0. Hence, a numerical value randomly selected from the range of 1 to 6 is used as the extension rate. As a result, the patterns set by generator 12 of terminal 10A and generator 12 of terminal 10B are different from each other. Here, it is assumed that generator 12 of terminal 10A has set a pattern in which the speed at which the volume of the alarm sound increases is faster.

At the prompt start time, terminal 10A and terminal 10B each control the output of the alarm sound (steps S105 to S106). Since the speed at which prompt controller 13 of terminal 10A increases the volume of the alarm sound is relatively fast, user U of terminal 10A notices the alarm sound earlier than user U of terminal 10B. After user U of terminal 10A notices the alarm sound, user U of terminal 10A performs an operation for stopping the output of the alarm sound. User U of terminal 10A also performs an operation for changing the bathtub filling time.

Terminal 10A performs control for changing the bathtub filling time after stopping the output of the alarm sound (steps S107 to S110).

When terminal 10A transmits the control information for changing the bathtub filling time (step S110), server 20 updates the managed bathtub filling time (step S201). Server 20 may further transmit information indicating the completion of update to terminal 10A as response information.

Since the speed at which prompt controller 13 of terminal 10B increases the volume of the alarm sound is relatively slow, user U of terminal 10B notices the alarm sound slower than user U of terminal 10A. After user U of terminal 108 notices the alarm sound, user U of terminal 108 performs an operation for stopping the output of the alarm sound. User U of terminal 10B also performs an operation for changing the bathtub filling time.

When terminal 10B transmits the control information for changing the bathtub filling time (step S110), server 20 updates the managed bathtub filling time (step S202). Server 20 may further transmit information indicating the completion of the update to terminal 10B as response information.

Since the patterns of terminal 10A and terminal 10B in the process sequence illustrated in FIG. 6 are different from each other, the update timing of the bathtub filling time and the communication timing of the control information and the response information of server 20 are different from each other.

Next, a related technique to be compared with system 1 will be described.

Figure 7:
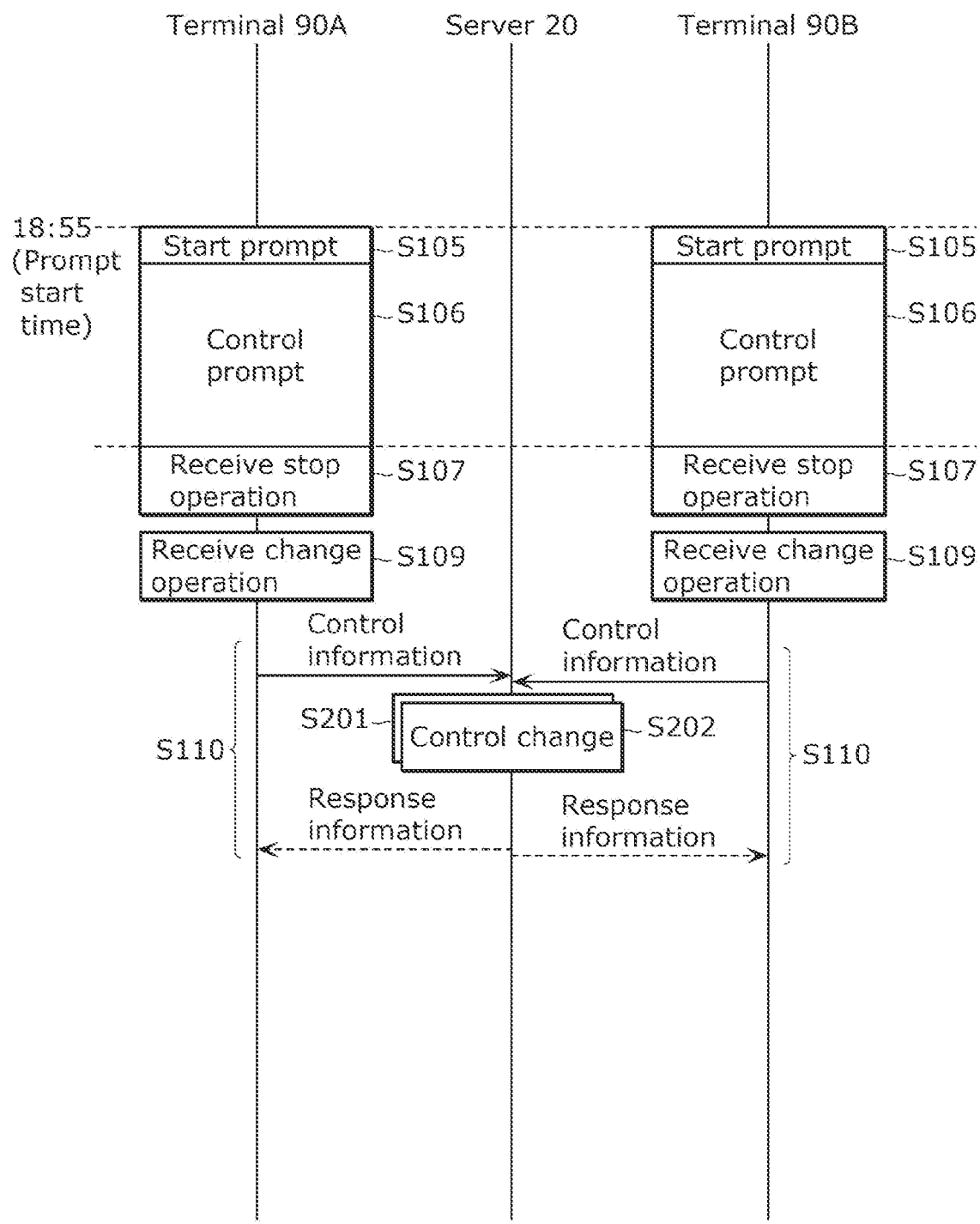
FIG. 7 is a sequence diagram illustrating processes of a system as a whole according to a related technique.

FIG. 7 is a sequence diagram illustrating processes of a system as a whole according to a related technique. Here, the related technique is a conventional technique in which instead of terminals 10A and 10B in the present embodiment, terminal 90A and terminal 90B are used which control the volume of the alarm sound in the same pattern regardless of whether or not the bathtub filling time meets a predetermined condition. The processes which are the same as those in the description of FIG. 6 are assigned the same reference numbers, and the detailed description thereof may be omitted.

As an example, the case in FIG. 7 will be described where server 20 receives control for changing the bathtub filling time from two users U who have originally set 19:00 as the bathtub filling time in a similar manner to FIG. 6.

Before the prompt start time, the pattern generating process and the like by terminals 90A and 90B is completed (step S103 and S104). At this time, generator 12 of terminal 90A and generator 12 of terminal 90B set the patterns in which the volume increasing speed of the alarm sound is the same.

At the prompt start time, each of terminal 90A and terminal 90B performs control for starting the output of the alarm sound and for outputting the alarm sound according to the pattern (steps S105 to S106). Since prompt controller 13 of terminal 90A and prompt controller 13 of terminal 90B control the volume of the alarm sound in the same pattern, users U of terminals 90A and 90B notice the alarm sound approximately at the same timing, and perform an operation for stopping the output of the alarm sound on terminals 90A and 90B approximately at the same timing. User U of each of terminal 90A and terminal 90B also performs an operation for changing the bathtub filling time.

When receiving the stopping operation, terminal 90A and 90B each perform control for changing the bathtub filling time after stopping the output of the alarm sound (step S110).

When the control information is transmitted from terminals 90A and 90B (step S110), server 20 updates the managed bathtub filling times based on the control information received from terminals 90A and 90B. Server 20 may further transmit information indicating the completion of the update to terminals 90A and 90B as response information (step S201 and S202).

Here, since the patterns of terminals 90A and 90B are the same, the update timing of the bathtub filling time and the communication timing of the control information and response information of server 20 are approximately the same, a problem occurs in that the timing of the processing by server 20 is concentrated. When the number of terminals is several hundreds, several tens of thousands or more than that, the problem of the concentration of the processing timing of server 20 becomes more distinct.

In contrast, according to the process sequence illustrated in FIG. 6, the update timing of the bathtub filling time and the communication timing of the control information and the response information of server 20 are different as described above. By distributing the processing timing of server 20 in such a manner, the concentration of the load of server 20 is reduced.

Note that system 1 according to the present embodiment may include a function of adjusting the pattern generated in step S104 or step S121 later by a user operation.

Figure 8:
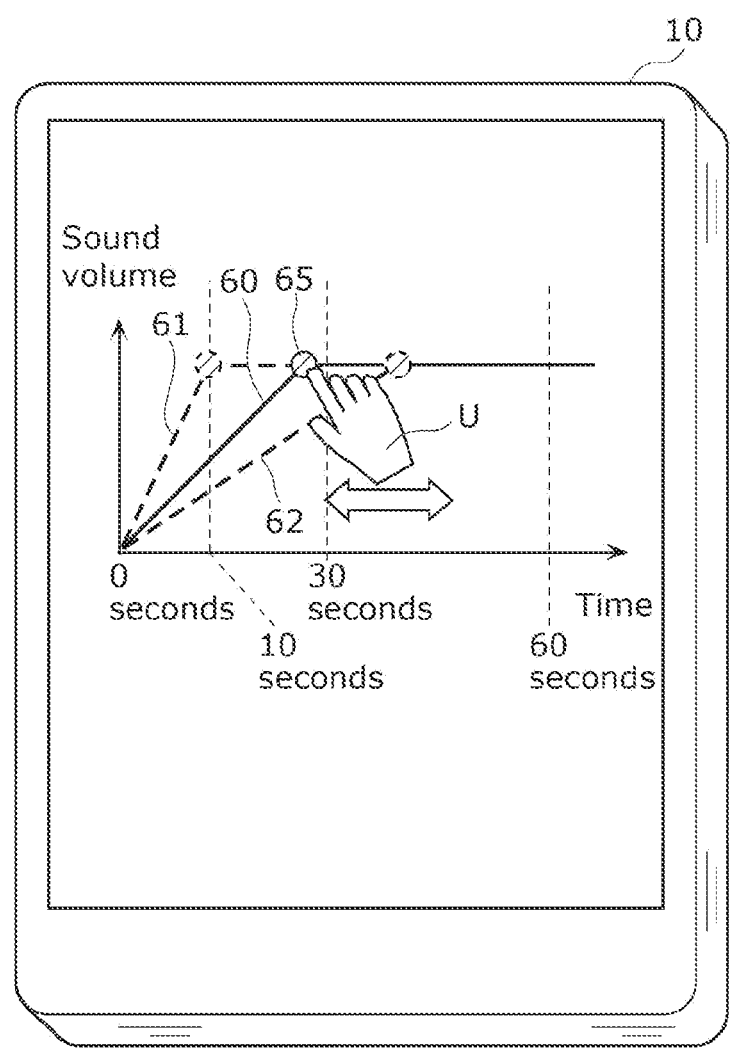
FIG. 8 illustrates a function of adjusting a pattern according to the embodiment.

FIG. 8 illustrates a function of adjusting a pattern according to the present embodiment.

FIG. 8 illustrates terminal 10 which displays an image used for an operation for adjusting a pattern. Here, the display screen of terminal 10 is a touch panel display, and is capable of receiving a touch operation made by user U. However, an aspect of the operation is not limited to such an example.

Terminal 10 displays, on the display screen, an image indicating pattern 60 generated in step S104 based on the initial pattern. The displayed image indicates temporal change in sound volume where the horizontal axis represents time and the vertical axis represents the sound volume of the alarm. In the horizontal axis, "0 second" corresponds to the prompt start time. The displayed image illustrates operation point 65 indicating the position where an operation from user U is received.

Terminal 10 receives an operation made by a touch operation from user U on the screen for extending or compressing the displayed pattern along the time axis. When receiving the operation, terminal 10 updates the displayed image to the image in which the pattern is extended or compressed along the time axis. It is assumed that user U operates operation point 65 to reflect the intention of the user.

For example, when user U performs an operation for compressing the pattern by a touch operation (an operation for moving the point toward the left in the drawing), terminal 10 updates pattern 60 to pattern 61 generated by compressing pattern 60 along the time axis. Moreover, when user U performs an operation for extending the pattern by a touch operation (an operation for moving the point toward the right in the drawing), terminal 10 updates pattern 60 to pattern 62 generated by extending pattern 60 along the time axis.

In such a manner, system 1 is capable of controlling the output of the alarm sound with pattern 61 or 62 in which the intention of user U is reflected on pattern 60 that is generated based on the initial pattern.

When the output of the alarm sound is controlled with pattern 61 or 62 in which the adjustment by user U is reflected on pattern 60 as described above, for users U who made the adjustment, the speeds at which the alarm sound increases can be relatively close values or the same value. However, some of users U do not make the adjustment. Hence, among the terminals operated by such users U who do not make the adjustment, the speeds at which the volume of the alarm sound increases can still be distributed.

Accordingly, among terminals 10, the timing at which each user U notices the inquiry from terminal 10 is distributed, and the timing at which each user U changes the schedule of filling bathtub 31 with hot water is also distributed. As a result, the timing of information processing by server 20 and the timing of communication by server 20 are also distributed.

With such an effect, system 1 according to the present embodiment is capable of reducing the concentration of load in processing and communication by server 20 also when there are a plurality of users U who do not use the adjustment function illustrated in FIG. 8.

Figure 9:
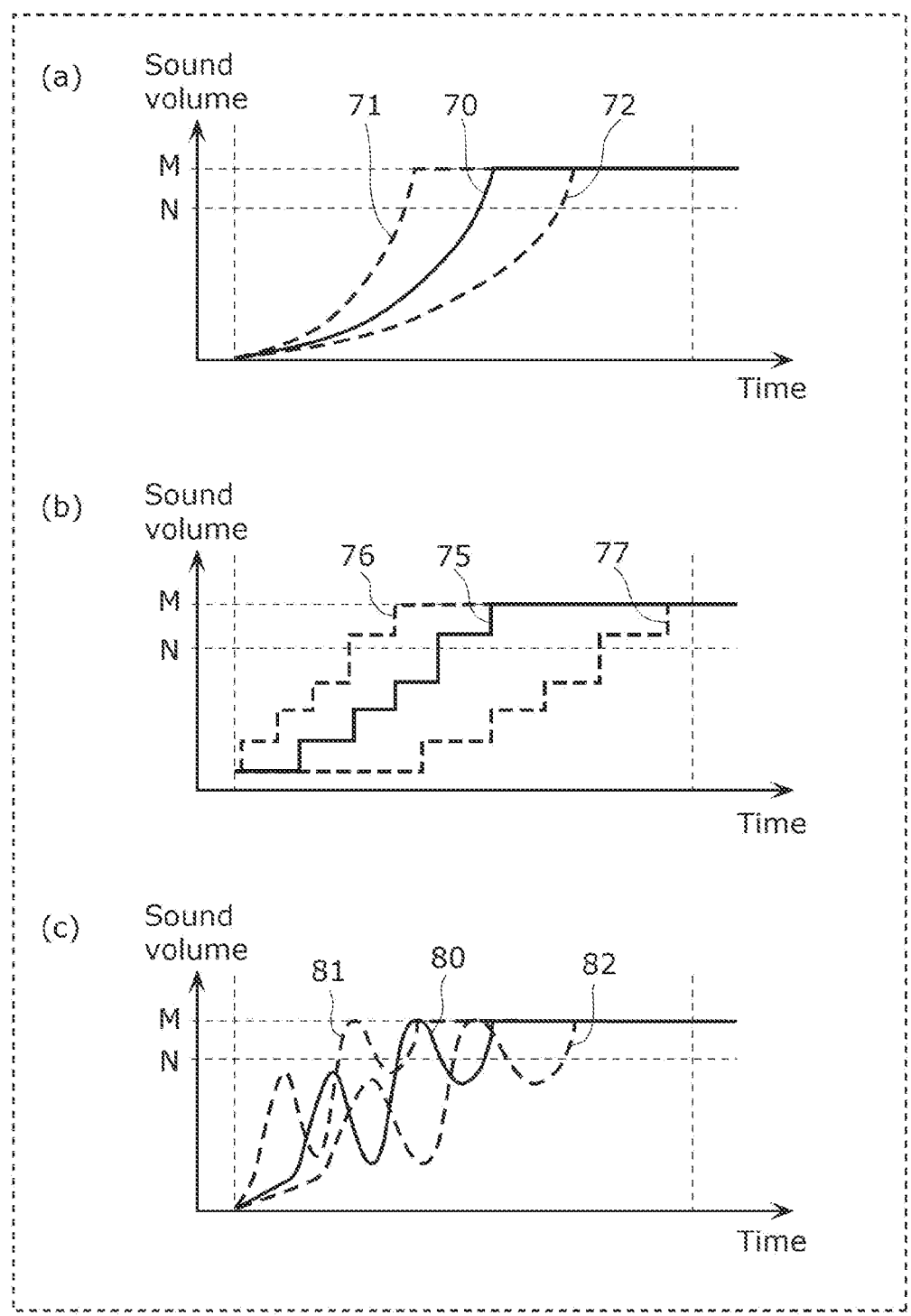
FIG. 9 illustrates examples of an initial pattern according to the embodiment.

FIG. 9 illustrates examples of an initial pattern according to the present embodiment.

Initial pattern 70 illustrated in (a) of FIG. 9 is an example of an initial pattern in which the sound volume increases in a curved line over time after the prompt start time, reaches the maximum sound volume, and then is maintained at the maximum sound volume. The shape of the curve may be any shape. In addition, pattern 71 and pattern 72 illustrated in (a) of FIG. 9 are examples of a pattern generated by compressing or extending initial pattern 70.

Initial pattern 75 illustrated in (b) of FIG. 9 is an example of an initial pattern in which the sound volume increases in a stepwise manner over time after the prompt start time, reaches the maximum sound volume, and then is maintained at the maximum sound volume. The increase range in each step may be any range. Pattern 76 and pattern 77 illustrated in (b) of FIG. 9 are examples of a pattern generated by compressing or extending pattern 75.

Initial pattern 80 illustrated in (c) of FIG. 9 is an example of an initial pattern in which the sound volume repeatedly increases and decrease along curves over time after the prompt start time, reaches the maximum sound volume, and then maintained at the maximum sound volume. The shape of the curves may be any shape. The sound volume may temporarily reach the maximum sound volume while repeatedly increasing and decreasing. Pattern 81 and pattern 82 illustrated in (c) of FIG. 9 are examples of a pattern generated by compressing or extending initial pattern 80.

With initial patterns 70, 75, or 80 illustrated in (a), (b), or (c) of FIG. 9, the intensity of the prompt is flexibly changed in various patterns. This prompts user U to notice the inquiry from terminal 10.

Variation 1 of Embodiment

In the present variation, another example of a configuration of the system which reduces an increase in server load will be described.

The structural elements which are the same as those in the embodiment described above are assigned the same reference numerals, and the description thereof may be omitted.

Figure 10:
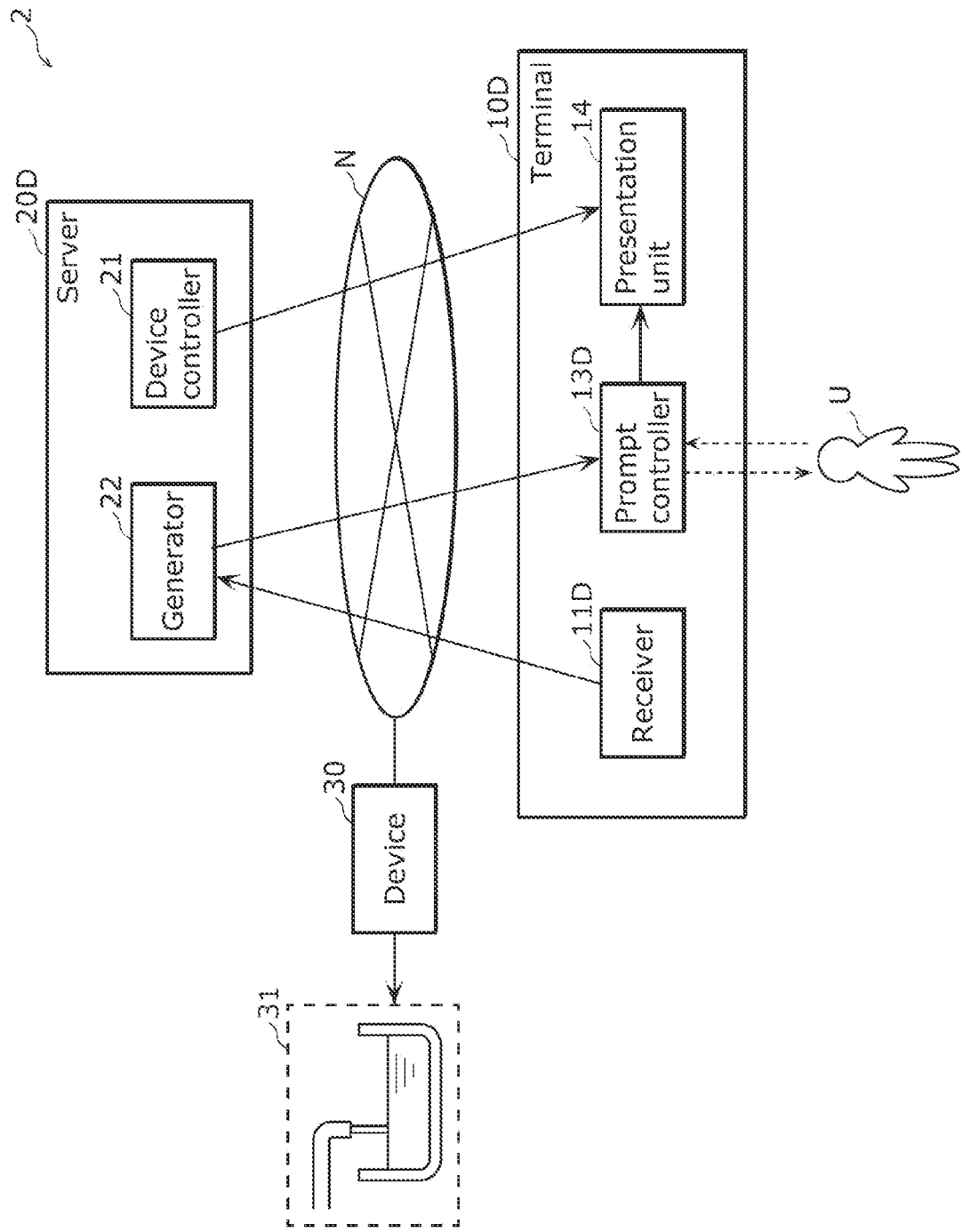
FIG. 10 schematically illustrates a configuration of a system according to Variation 1 of the embodiment.

FIG. 10 schematically illustrates a configuration of system 2 according to the present variation.

System 2 according to the present variation includes terminal 10D and server 20D.

Terminal 10D includes receiver 11D, prompt controller 13D, and presentation unit 14.

Server 20D includes device controller 21 and generator 22.

System 2 is different from system 1 according to the embodiment described above mainly in that generator 22 is included in server 20D.

Receiver 11D is a functional unit which obtains a prompt start time. Receiver 11D obtains the operation start time which is a time in a schedule at which device 30 starts the operation, and obtains, as the prompt start time, the time that is a predetermined period before the obtained operation start time. Receiver 11D transmits the obtained prompt start time to generator 22 of server 20D. The other features of receiver 11D are the same as those of receiver 11 according to the embodiment described above.

Generator 22 is a functional unit which generates a pattern of alarm sound. Generator 22 receives the prompt start time from receiver 11D of terminal 10D, generates a pattern of alarm sound using the received prompt start time, and transmits the generated pattern to terminal 10D. The other features of generator 22 are the same as those of generator 12 according to the above embodiment.

Prompt controller 13D is a functional unit which controls the output of the alarm sound performed by terminal 10D. Prompt controller 13D receives the pattern from generator 22 of server 20D, and controls the output of the alarm sound according to the received pattern. The other features of prompt controller 13D are the same as those of prompt controller 13 according to the above embodiment.

According to system 2 in the present variation, the pattern generating process by generator 22 is performed by server 20D, and thus, it is possible to reduce the work and consumed power related to the maintenance of the program related to the generating process. For example, when the program related to the generating process is updated, and the pattern generating process is executed by each of terminals 10D as in system 1, each terminal 10D is required to download the program beforehand, and work and power consumption are required for the downloading. In contrast, when the pattern generating process is executed by server 20D as in system 2, it is possible to reduce the work and the consumed power for downloading the program.

Variation 2 of Embodiment

In the present variation, another example of the configuration of the system which reduces an increase in server load will be described.

The structural elements which are the same as those in the embodiment and the variation described above are assigned the same reference numerals, and the description thereof may be omitted.

Figure 11:
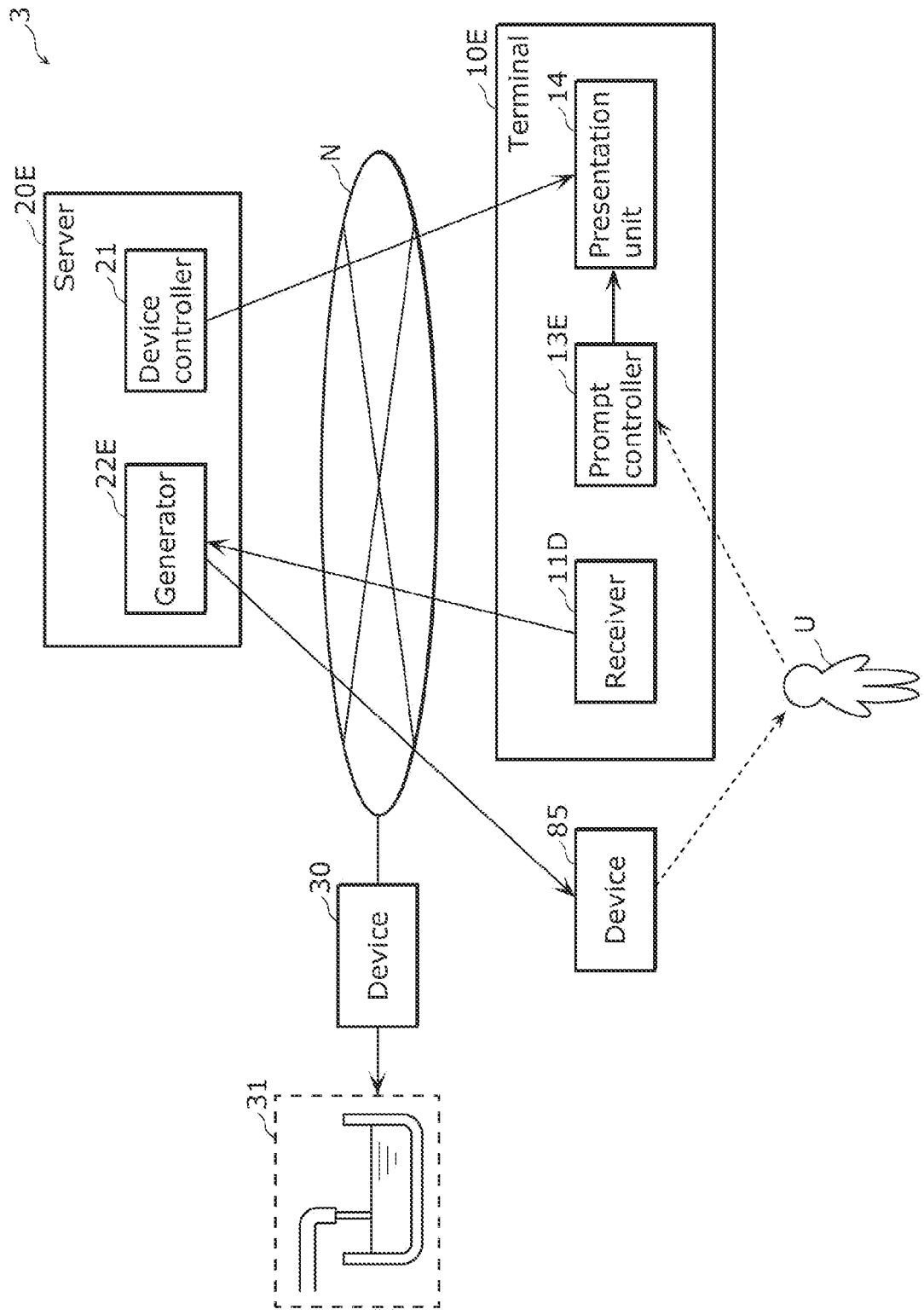
FIG. 11 schematically illustrates a configuration of a system according to Variation 2 of the embodiment.

FIG. 11 schematically illustrates a configuration of system 3 according to the present variation.

System 3 according to the present variation includes terminal 10E, server 20E, and device 85.

Terminal 10E includes receiver 11D, prompt controller 13E, and presentation unit 14.

Server 20E includes device controller 21 and generator 22E.

System 3 is different from system 2 according to the variation described above mainly in that, among the functions of prompt controller 13D in system 2, the function which outputs a prompt is included in device 85. Device 85 corresponds to a second device.

Generator 22E is a functional unit which generates a pattern of alarm sound. Generator 22E receives the operation start time from receiver 11D of terminal 10E, generates a pattern of alarm sound using the received operation start time, and transmits the generated pattern to device 85. The other features of generator 22E are the same as those of generator 12 according to the above embodiment.

Device 85 is a device which outputs alarm sound, and is, for example, a speaker device. Device 85 receives the pattern from generator 22E of server 20E, and controls output of the alarm sound according to the received pattern. The other features of device 85 are the same as those of generator prompt controller 13 according to the embodiment described above. Examples of device 85 include an air conditioner or a fan which outputs air as a prompt, an illumination device which outputs light as a prompt, and a mobile terminal or a bed which outputs vibration as a prompt. Device 85 may be a device specific for outputting a prompt to user U, or a device which is already used in the daily life of user U may serve as device 85.

When receiving an operation for stopping the output of the alarm sound from user U, prompt controller 13E performs control for stopping the output of the alarm sound.

According to system 3 in the present variation, a prompt output by various types of devices such as a dedicated device or a device which has been used in daily life can be given to user U. In particular, when a prompt is given to user U by a device which is used in daily life, there is an advantage that a dedicated device in not required.

Variation 3 of Embodiment

In the present variation, another example of the configuration of the system which reduces an increase in server load will be described.

The structural elements which are the same as those in the embodiment and the variations described above are assigned the same reference numerals, and the description thereof will be omitted.

Figure 12:
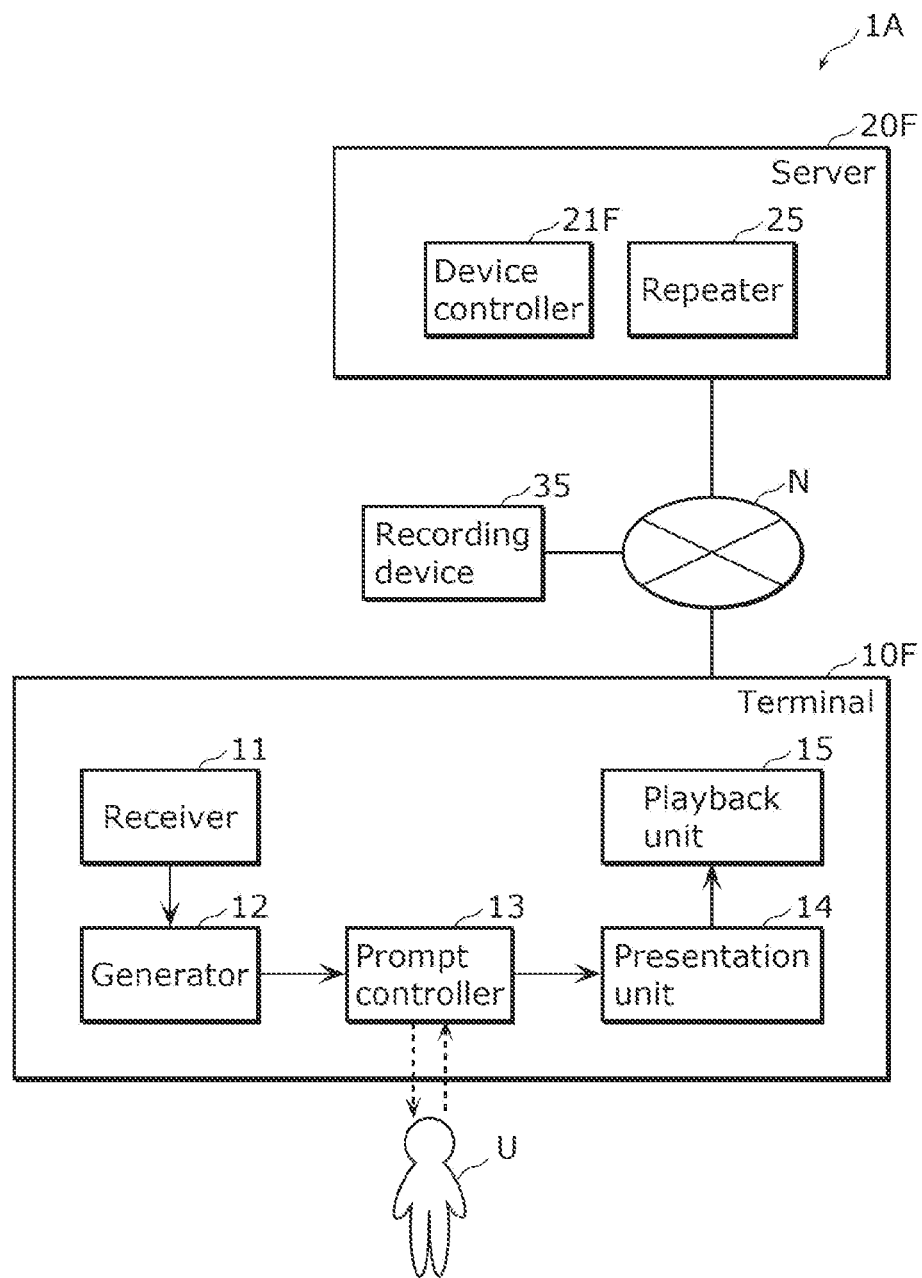
FIG. 12 schematically illustrates a configuration of a system according to Variation 3 of the embodiment.

FIG. 12 schematically illustrates an example of system 1A according to the present variation. System 1A illustrated in FIG. 12 is a system which performs an inquiry related to an operation of a device with a prompt to user U.

Here, the case where a device is recording device 35 which records video and transmits video data will be described as an example. Recording device 35 corresponds to the first device. The operation performed by recording device 35 is to transmit video data. System 1A displays, on the screen of the terminal, presentation information inquiring whether to transmit video data as scheduled at a predetermined period before the time at which recording device 35 is scheduled to start transmission of the video data, and system 1A also prompts the user to notice the inquiry with the output of the alarm sound or a change in sound volume that is output.

System 1A according to the present variation includes server 20F and terminal 10F. System 1A is communicatively connected to recording device 35 via network N.

Terminal 10F is a communication terminal owned by user U, in a similar manner to terminal 10 according to the embodiment described above. Terminal 10F receives, from user U, the time at which playback of video data is scheduled to start (also referred to as an operation start time). Terminal 10F outputs alarm sound at a predetermined period before the operation start time (also referred to as a prompt start time), and inquires of user U whether to start video playback at the operation start time as scheduled. When receiving an operation made by user U for changing the schedule of video playback, terminal 10F performs control for changing the schedule. The predetermined period is, for example, approximately one minute or ten seconds. Terminal 10F is an example of a device which outputs a prompt to user U.

Terminal 10F includes receiver 11, generator 12, prompt controller 13, presentation unit 14, and playback unit 15. Receiver 11, generator 12, prompt controller 13, and presentation unit 14 are the same as the functional units with the same names included in terminal 10 according to the embodiment.

Playback unit 15 is a functional unit which plays back video data. Playback unit 15 receives the recorded data transmitted by recording device 35 and repeated by repeater 25, and plays back the video based on the received recorded data.

Server 20F includes device controller 21F which controls recording device 35, and repeater 25 which repeats the video data to be transmitted from recording device 35 to terminal 10F.

Device controller 21F is similar to device controller 21 according to the embodiment, and obtains and manages the operation start time as the schedule of the operation of recording device 35 (specifically, operation of transmitting video data). When receiving control for changing the operation start time from terminal 10F, device controller 21F changes the managed operation start time for update. Device controller 21F causes recording device 35 to transmit video data by transmitting control information to recording device 35 at the operation start time.

Repeater 25 is a functional unit which receives the video data transmitted from recording device 35 and transmits the received video data to terminal 10F. In general, the IP address used by recording device 35 for communication is a private address used at home. Hence, it is not assumed that terminal 10F and recording device 35 directly communicate with each other, and it is assumed that terminal 10F and recording device 35 communicate with each other via repeating by server 20F.

Recording device 35 is a device which is provided at home of user U, records video, and stores video data.

Recording device 35 starts transmitting the video data to terminal 10F at the operation start time according to the control by device controller 21F.

Recording device 35 transmits the video data recorded for a first few minutes at once when terminal 10F starts playback of the video data. This is because terminal 10F buffers the video data recorded for a few minutes in order for smooth video playback. Hence, the load for data processing and communication processing of recording device 35 and server 20F increases, or the communication amount increases.

Figure 13:
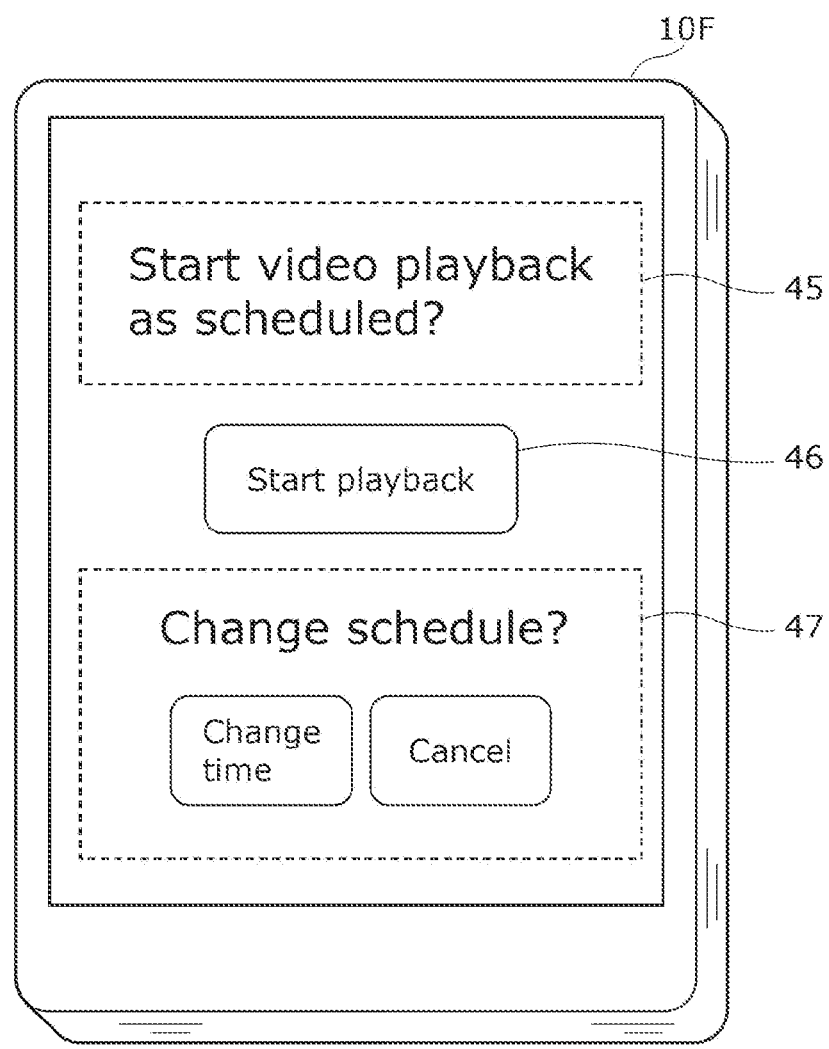
FIG. 13 illustrates an example of presentation information according to Variation 3 of the embodiment.

FIG. 13 illustrates an example of presentation information according to the present variation.

The presentation information illustrated in FIG. 13 is an example of an image displayed on the screen by presentation unit 14 of terminal 10F.

The image illustrated in FIG. 13 includes image 45, image 46, and image 47.

Image 45 is an image that inquires of the user whether to start video playback as scheduled. It can also be said that image 45 is an image that inquires of the user whether to transmit video data as scheduled.

Image 46 is an image for receiving an operation for starting video playback. When image 46 is operated, presentation unit 14 performs, on server 20F, control for starting video playback as scheduled.

Image 47 includes an image indicating an inquiry to the user as to whether to change the schedule of video playback, and an image which indicates options of "change time" and "cancel" as a response to the inquiry. User U may perform a selection operation on the options.

When receiving an operation made by user U for selecting "change time", presentation unit 14 transmits control information for changing the operation start time to server 20F.

When receiving an operation made by user U for selecting "cancel", presentation unit 14 transmits control information for not causing the device to operate to server 20F.

In the above, an option "no change" may be displayed in a similar manner to FIG. 4. When the option "no change" is selected, presentation unit 14 causes server 20F to start video playback as scheduled. This is the same as the case when image 46 is operated. When receiving no operation for the options from user U, the process which is the same as the case where "no change" is selected may be performed.

The processes of system 1A according to the present variation are the same as the processes (see FIG. 5) of system 1 according to the embodiment except for that the "fill bathtub with hot water" is replaced with "start video playback". By doing so, device controller 21F causes recording device 35 to transmit the video data to terminal 10F at the playback start time so that the video is played back on terminal 10F (step S111).

With this, system 1A is capable of reducing an increase in load of the processing and communication of server 20F.

When image 46 is operated, presentation unit 14 may update the operation start time earlier to the current time. By doing so, it is possible to promptly start video playback when image 46 is operated.

As described above, with the control method according to the embodiment and variations described above, a prompt is output in a pattern extended or compressed from the initial pattern, so that the timing at which each user operates the terminal based on the output prompt can be temporally distributed. When the server processing or communication is generated based on the operation, the timing of the processing or communication is distributed. This reduces an instantaneous increase in server load or an increase in communication amount of the server. Accordingly, the control method according to the present disclosure is capable of reducing an increase in server load.

As a measure for distributing the processing timing of the server other than the above, a possible measure is to distribute the timing of the start of the output of a prompt. However, when the timing of the start of the output of the prompt is changed, a prompt may start to be output after the prompt start time. In such a case, the user may recognize that the system has a failure because a prompt does not start to be output at the desired prompt start time. Accordingly, it is inappropriate to distribute the timing at which a prompt starts to be output in order to distribute the processing timing of the server. It can also be said that the control method according to the present disclosure is capable of reducing an increase in server load without performing the above inappropriate processing.

When the operation start time meets a predetermined condition, a prompt is output in a pattern extended or compressed from the initial pattern, and thus, the timing at which each user operates the terminal based on the output prompt can be temporally distributed. With this, when it is assumed that the same operation start time is set to a plurality of first devices, it is possible to distribute the time at which a prompt is output. Accordingly, it is possible to reduce an increase in server load.

Moreover, it is possible to distribute the processing timing of the server when the time that is relatively highly probable to be set by a plurality of users as the operation start time is set as the operation start time. The time that is relatively highly probable to be set by a plurality of users as the operation start time tends to be set as the operation start time by a large number of users. Hence, the server load tends to increase at the time when the users notice the prompts before the operation start time. Hence, when the operation start time obtained from a user is the time that is relatively highly probable to be set by a plurality of users as the operation start time, it is possible to distribute the processing timing of the server by outputting a prompt in a pattern extended or compressed from the initial pattern. Accordingly, the control method in the present disclosure is capable of reducing an increase in server load.

Moreover, as the time that is relatively highly probable to be set by a plurality of users as the operation time, specifically, the time which is expressed in hours, minutes, and seconds and in which the numerical value in minutes is 0, an integral multiple of 10, or an integral multiple of 15 is used. Hence, it is possible to more easily determine whether or not the operation start time received from the user is the time that is relatively highly probable to be set by a plurality of users as the operation start time. Accordingly, the control method in the present disclosure is capable of reducing an increase in server load.

Moreover, when the operation start time is the time that is relatively highly probable to be set by a plurality of users as the operation start time, a pattern is generated according to the numerical value in minutes. With an increase in probability, a pattern extended or compressed with a greater extension or compression rate is generated. Hence, the extension or compression rate of the pattern increases when the operation start time is set to the time at which an increase in server load tends to further increase. This increases the effect of distributing the server load. Accordingly, the control method in the present disclosure is capable of reducing an increase in server load more adaptively according to the set operation start time.

Moreover, a pattern is generated with an extension or compression rate selected randomly from among the determined range of the extension or compression rate, and thus, it is possible to increase the effect of distributing the server load. Accordingly, the control method in the present disclosure is capable of further reducing an increase in server load.

Moreover, a prompt is output to the user by using, as an initial pattern, a pattern in which the intensity of the prompt is maintained or increases over time, and by using the pattern generated from the initial pattern. Accordingly, the control method in the present disclosure is capable of more easily reducing an increase in server load.

Moreover, a prompt is output to the user by using, as an initial pattern, a pattern in which the user is prompted with an intensity which increases and decreases but finally reaches a maximum level, and by using the pattern generated from the initial pattern. Accordingly, the control method in the present disclosure is capable of more easily reducing an increase in server load.

Moreover, the timing of control for changing the schedule of the first device based on an operation made by the user is distributed. This distributes the server load, which is capable of reducing an increase in server load.

Moreover, the timing at which the first device changes the schedule of filling a bathtub with hot water and the communication timing for the change are distributed. Accordingly, it is possible to reduce an increase in load of the server which controls the device which fills the bathtub with hot water.

Moreover, the timing at which the first device changes the schedule of transmission of video data and the communication timing for the change are distributed. Accordingly, it is possible to reduce an increase in load of the server which controls the device which transmits the video data.

Moreover, any one of sound, light, temperature, wind, and vibration is used as a prompt. Accordingly, the control method in the present disclosure is capable of reducing an increase in server load while using any one of the sound, light, temperature, wind and vibration as a prompt.

As examples of the technique according to the present disclosure, the embodiment and the like has been described above. To that end, the accompanying drawings and detailed descriptions have been provided.

Therefore, the structural elements described in the attached drawings and the detailed description may include not only the structural elements essential for solving the problem but also the structural elements not essential for solving the problem in order to illustrate the implementation. Hence, the fact that these non-essential structural elements are described in the accompanying drawings or detailed description should not immediately determine that those non-essential structural elements are essential.

Additionally, since the above described embodiment is for illustrating the examples of the technique in the present disclosure, various changes, replacements, additions, omissions, etc. can be made within the scope of claims or the equivalent scope thereof.

INDUSTRIAL APPLICABILITY

The present disclosure is applicable to a control method which reduces an increase in server load. Specifically, the present disclosure is applicable to a control method which controls a device which outputs a prompt to a user.

The invention claimed is:

1. A control method comprising:
   obtaining, as a prompt start time, a time that is a predetermined period before an operation start time which is a time in a schedule at which a first device starts an operation;
   generating a pattern that is extended or compressed along a time axis from an initial pattern indicating a temporal change in an intensity of a prompt; and
   causing a second device to start outputting the prompt at the prompt start time and to output the prompt with an intensity indicated by the pattern generated.

2. The control method according to claim 1,
   wherein the generating includes:
   determining whether or not the operation start time meets a predetermined condition; and
   the generating of the pattern is performed when the operation start time is determined to meet the predetermined condition.

3. The control method according to claim 2,
   wherein, in the determining, the predetermined condition is a condition in which the operation start time is a time predetermined as a time that is relatively highly probable to be set as the operation start time by each of users of a plurality of first devices each of which is the first device.

4. The control method according to claim 2,
   wherein, in the determining, the predetermined condition is a condition in which a numerical value in minutes of the operation start time that is expressed in hours, minutes, and seconds is 0, an integral multiple of 10, or an integral multiple of 15.

5. The control method according to claim 4,
   wherein the determining further includes determining a range of an extension or compression rate according to the operation start time,
   the determining of the range of the extension or compression rate includes:
   determining a first range as the range of the extension or compression rate when the numerical value in minutes of the operation start time that is expressed in hours, minutes, and seconds is 0;
   determining a second range that is smaller than the first range as the range of the extension or compression rate when the numerical value in minutes of the operation start time that is expressed in hours, minutes, and seconds is 30;
   determining a third range that is smaller than the second range as the range of the extension or compression rate when the numerical value in minutes of the operation start time that is expressed in hours, minutes, and seconds is 15 or 45; and
   determining a fourth range that is smaller than the third range as the range of the extension or compression rate when the numerical value in minutes of the operation start time that is expressed in hours, minutes, and seconds is 10, 20, 40, or 50, and
   the generating of the pattern includes generating the pattern with an extension or compression rate included in the range of the extension or compression rate determined.

6. The control method according to claim 5,
   wherein the generating of the pattern includes selecting randomly one of a plurality of extension or compression rates included in the range of the extension or compression rate determined, and generating the pattern with the one of the plurality of extension or compression rates selected.

7. The control method according to claim 1, wherein the initial pattern is a pattern in which the intensity of the prompt is maintained or increases over time.

8. The control method according to claim 1, wherein the initial pattern is a pattern in which:
(a) the intensity of the prompt increases from 0 at the prompt start time;
(b) the intensity of the prompt increases and decreases in a range that is greater than 0 and less than a predetermined intensity during a second predetermined period after the prompt start time; and
(c) the intensity of the prompt is maintained at the predetermined intensity after an elapse of the second predetermined period from the prompt start time.

9. The control method according to claim 1, further comprising:
performing control for changing the schedule of the first device when receiving, after the prompt start time, an operation for changing the schedule of the first device from a user.

10. The control method according to claim 1, wherein the first device is a device which fills a bathtub with hot water, and
the operation of the first device is to fill the bathtub with hot water.

11. The control method according to claim 1, wherein the first device is a device which transmits video data, and
the operation of the first device is to transmit the video data.

12. The control method according to claim 1, wherein the prompt includes any one of sound, light, temperature, wind, and vibration.

13. A control device comprising:
a receiver which obtains, as a prompt start time, a time that is a predetermined period before an operation start which is a time in a schedule at which a first device starts an operation;
a generator which generates a pattern extended or compressed along a time axis from an initial pattern indicating a temporal change in an intensity of a prompt; and
a prompt controller which causes a second device to start outputting the prompt at the prompt start time, and to output the prompt with an intensity indicated by the pattern generated.

14. A non-transitory computer-readable recording medium for use in a computer, the recording medium having a computer program recorded thereon for causing the computer to execute the control method according to claim 1.

* * * * *